Sept. 22, 1970　　　　　D. M. FENTON　　　　　3,530,109

ETHYLENE-CARBON MONOXIDE COPOLYMERS

Filed Dec. 5, 1966

INVENTOR.
DONALD M. FENTON
BY
ATTORNEY

United States Patent Office 3,530,109
Patented Sept. 22, 1970

3,530,109
ETHYLENE-CARBON MONOXIDE COPOLYMERS
Donald M. Fenton, Anaheim, Calif., assignor to Union Oil Company of California, Los Angeles, Calif., a corporation of California
Filed Dec. 5, 1966, Ser. No. 599,243
Int. Cl. C08f *1/64, 13/04*
U.S. Cl. 260—94.9      4 Claims

ABSTRACT OF THE DISCLOSURE

Copolymers of a $C_2$–$C_8$ alpha-olefin and carbon monoxide are produced using palladous cyanide as a catalyst. The ethylene-carbon monoxide copolymer has a melting point of about 250° to 350° C. and can be converted to a thermosetting compound by heating.

---

This invention relates to a high melting point polymer, and more specifically to a copolymer of a normal α-olefin and mixtures thereof with carbon monoxide and its manufacture.

Copolymers of ethylene and carbon monoxide have been prepared using a free radical catalyst while employing moderate to superatmospheric pressures. These copolymers are disclosed by Brubaker et al. in the J.A.C.S. Vol. 74, p. 1509–15. They vary in molecular weight from about 300 to 3800 and are essentially linear; fractionation of the copolymers have produced a material having a molecular weight of about 7800. Because of their low melting points, 25°–117° C., these materials have found little use. Similar higher molecular weight copolymers have also been produced by Chatani et al. as disclosed in the Journal of Polymer Science, 1961, Vol. 55, pages 811–819. These polyketones melt at about 185° C. and are quite brittle. They have also found little use commercially.

It is therefore an object of the invention to provide a new high melting point, normal, α-olefin-carbon monoxide copolymer and a process for its manufacture.

Another object is to provide a high melting point copolymer of a normal α-olefin and carbon monoxide.

Another object is to provide a cross-linked, high melting point, ethylene-carbon monoxide copolymer which may be further cross-linked by heating.

Another object is to provide a cross-linked, high melting point propylene-carbon monoxide copolymer which may be further cross-linked by heating.

Other objects of the invention will become apparent from the description to follow.

Figure 1:
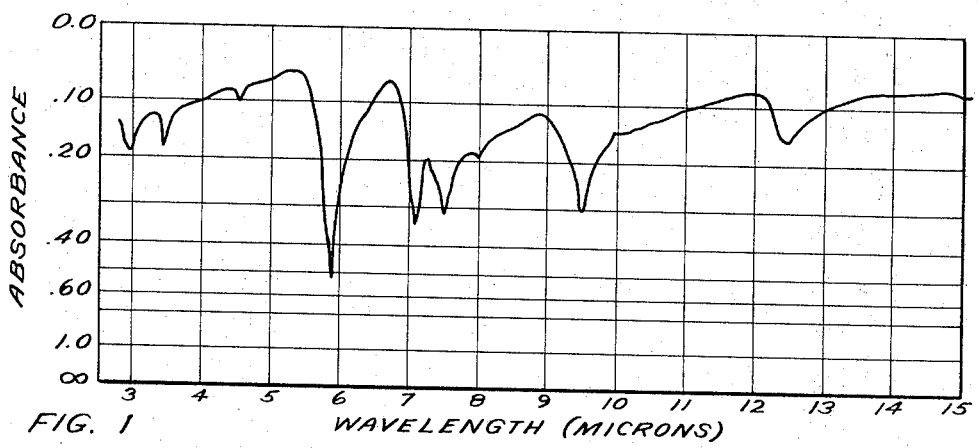
Figure 2:
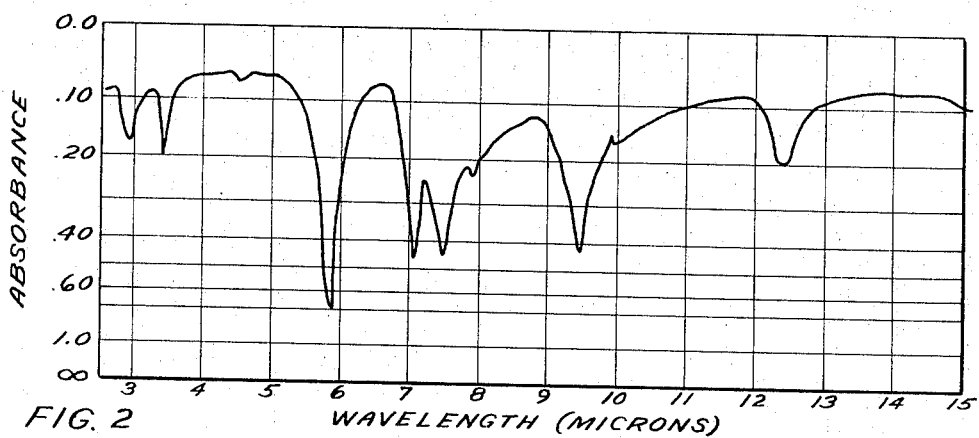
Figure 3:
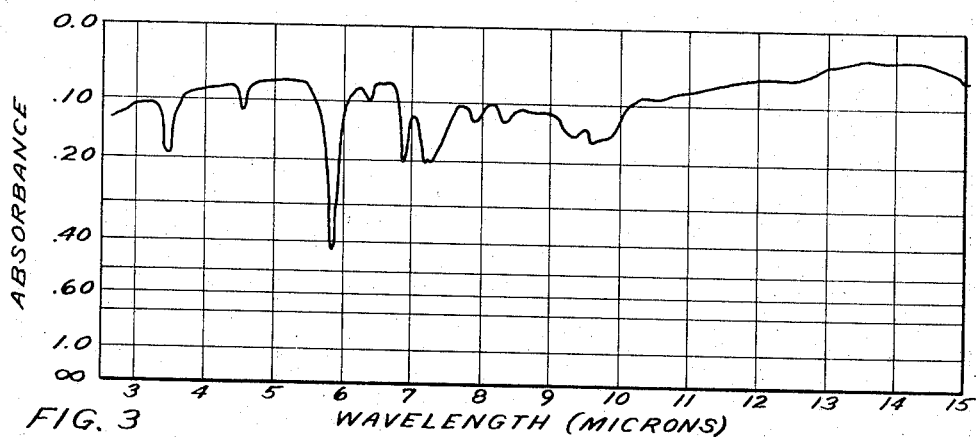

FIGS. 1–3 are the graphs showing the types of infra red spectra of various copolymers made by the process of the present invention.

The present invention provides a new class of high molecular weight, α-olefin-carbon monoxide copolymers having a melting point in the order of 250°–350° C., with consequently greatly enhanced end use properties. The copolymers are produced by reacting normal, α-olefins with carbon monoxide in the presence of palladous cyanide, $Pd(CN)_2$, as a catalyst. If desirable, reaction systems which generate or regenerate the $Pd(CN)_2$ in situ also may be employed.

Co-catalysts may be employed in conjunction with the palladous cyanide and their use permits a reduction in requirement of that catalyst which is very expensive. Mercuric ion formers such as mercuric acetate and mercuric cyanide; carbonyl ion formers such as $Fe_3(CO)_{12}$; and free radical catalysts such as benzoyl peroxide may be employed.

The normal, α-olefins contemplated by this invention include ethylene, propylene, and up to 1-octene and include mixtures thereof.

The mole ratio of α-olefin to carbon monoxide may vary from about 1/5 to about 5/1 and preferably from about 3/7 to about 4/1. The most preferred ratio is 1:1.

The reaction may be conducted in solution with a wide range of solutions being available. These include: tetrahydrofuran, chloroform, toluene, acetonitrile, heptane, ethylene glycol, and water.

The reaction temperatures vary from about 50° C. to about 205° C. and preferably from about 90° C. to about 125° C.

The reaction pressures vary upwards from about 300 p.s.i., the upper limit being determined by the strength of the reaction vessel. A useful upper limit is about 3000 p.s.i. If desired, inert gases such as nitrogen, carbon dioxide, and propane can be used to increase the pressure of the reactants.

Since only small amounts of reactants were employed in the examples, the reaction times employed were made lengthy to ensure the reaction went to completion.

By varying one or more of the co-catalysts, olefin mixtures, olefin-CO ratios, reaction solutions, temperatures, pressure and reaction times, the properties of the copolymer can be changed considerably.

The reaction vessel employed was a bomb made of steel; other metals in place of steel may be used such as titanium, tantalum, etc. A glass lined bomb may also be employed.

EXAMPLE 1

Into a steel bomb was charged 100 ml. of tetrahydrofuran, and ½ gram $Pd(CN)_2$. The bomb was pressured to 400 p.s.i. with ethylene, and further pressured with 400 p.s.i. of carbon monoxide to bring the total pressure to 800 p.s.i. The bomb was heated to 150°±5° C. and maintained at that temperature with rocking for 6 hours.

TABLE

| Example No. | Wt. Pd (CN)₂ gms. | Co-cat. | Wt. co-cat. gms. | Solvent | Volume solvent, ml. | Olefin | Olefin pressure p.s.i. or vol. ml. | CO press., p.s.i. | Final press., p.s.i. | React. temp. | React. Time, hrs. | M.P. Polymer, ° C. | Wt. poly gms. |
|---|---|---|---|---|---|---|---|---|---|---|---|---|---|
| 2 | ½ | | | CHCl₃ | 100 | Ethylene | 400 | 400 | 440 | 100 | 6 | >350 | 9 |
| 3 | ½ | Hg(CN)₂ | 5 | Toluene | 100 | do | 400 | 400 | 750 | 90 | 4 | | 5 |
| 4 | ½ | | | Acetonitrile | 100 | do | 400 | 400 | 600 | 100 | 6 | | 4 |
| 5 | ½ | | | Heptan | 100 | 1-octene | 25 ml. | 600 | 400 | 125 | 6 | | 0.5 |
| 6 | ½ | | | do | 100 | Propylene | 35 gms. | 800 | 700 | 125 | 6 | | 4 |
| 7 | ½ | Benzoyl peroxide | ½ | Toluene | 100 | Ethylene | 400 | 400 | 550 | 100 | 6 | (¹) | 9 |
| 8 | ½ | | | Ethylene glycol | 100 | do | 400 | 400 | 600 | 125 | 6 | (²) | 3 |
| 9 | ½ | Hg(OA)₂ | 1 | Toluene | 100 | do | 400 | 400 | 475 | 125 | 6 | | 13 |
| 10 | ½ | | | do | 100 | do | 800 | 200 | 750 | 100 | 6 | | 1 |
| 11 | ½ | | | do | 100 | do | 400 | ³ 400 | 1,050 | 200 | 6 | >350 | 7 |
| 12 | ½ | | | do | 100 | do | 300 | 700 | 800 | 125 | 4 | >350 | 6 |
| 13 | ½ | | | Water | 100 | do | 500 | 500 | 625 | 125 | 6 | (⁴) | 9 |
| 14 | ½ | Fe₃(CO)₁₂ | ½ | do | 100 | do | 500 | 500 | 950 | 125 | 6 | >350 | 1.5 |

¹ Softens 250° C.–260° C.
² Sticky.
³ H₂ about 400.
⁴ Softens 250° C.

At the end of that time, the bomb was depressurized from its final pressure of 490 p.s.i. and there was obtained 6 grams of solid polymer containing palladium metal. The polymer had a melting point exceeding 350° C.

The preceding table illustrates variations (using the process of Example 1) where different α-olefin reactants, co-catalysts, solvent solutions, reaction temperatures, reaction pressures and ethylene-CO ratios are employed.

The polymeric products are high molecular weight copolymers of ethylene and carbon monoxide and have a melting point range from about 250° C. to greater than 350° C. Unlike the linear microcrystalline wax type of copolymers produced by Brubaker et al., the α-olefin copolymers of the present invention are cross-linked and thermoplastic at low temperatures. On heating, they become highly cross-linked and thermoset.

When heated to about over 200° C., the ethylene copolymers soften and become flexible and plastic; they can be fused into film between hot plates or consolidated by a spatula into various shapes that are useful in high temperature work such as moldings, gaskets, etc. The higher α-olefin copolymers have lower softening temperatures but are otherwise the same. The ethylene copolymer retains its shape at high temperatures because it is converted by the heat from a thermoplastic having a moderate amount of cross-linking to a thermoset plastic having a high degree of cross-linking. When heated to about 450° C. in air, the copolymer begins to glow and char.

Both thermoplastic and thermoset copolymers may be used for film and for moldings. The thermoset copolymer will, of course, retain its shape at higher temperatures.

The infra red spectra of the copolymer as shown in FIGS. 1 and 2 are typical of the ethylene-carbon monoxide copolymers produced by the process of the present invention. The spectra of FIG. 1 was obtained from the copolymer of Example 1 while that of FIG. 2 was obtained from Example 13.

FIG. 3 is the spectrum of the propylene-carbon monoxide copolymer of Example 6. This copolymer, like the copolymers of ethylene is cross-linked and moldably thermoplastic at low temperatures. At temperatures exceeding about 200° C. the copolymer becomes highly cross-linked and thermoset.

A sample about 0.5% by weight, of each copolymer was prepared in KBr pellets, and spectra were run on each sample. The pellets were then heated to 175° F. under low pressure to remove adsorbed water from the pellet surfaces. In one sample, Example 6 (FIG. 3), the water was successfully removed; in the other two, a reduction in water was achieved, but not complete removal. This may be seen in the spectra run of the treated pellets. The spectra from Examples 1 and 13 were run on a Perkin Elmer 21 prism infrared spectrophotometer. A third set of spectra was made on the dehydrated pellets of Example 6 using a Cary 90 grating spectrophotometer.

The spectra types of Examples 1 and 13 are substantially identical, indicating that the two examples are the same material. Major peaks fall at about 3.45, 5.90, 7.10, 7.50, 9.50 and 12.40 microns; minor peaks occur at about 4.50, 7.40 and 8.00 microns. Both spectra show a peak at about 3.00 microns, but this is probably residual water and not a significant functional group OH related to the sample.

The spectra of Example 6 is markedly different from the spectra of Examples 1 and 13. Major peaks occur at about 3.45, 5.85, 6.85 and 7.20 microns; the 7.20 peak is not a single absorption, but a group whose individual absorptions occur at about 7.18, 7.30 and 7.40 microns. Minor absorptions occur at 4.50, 6.40, 7.80 and 8.30 microns, together with two other rather broad peaks at about 9.35 and 9.70 microns.

The peak at about 5.90 microns present in all sample spectra is a carbonyl absorption representing a ketone structure. The sharpness of this peak in the grating spectra shows that only one class of structure is involved (ketone only). Additionally, it appears the material is saturated, and does not involve nonhydrocarbons, e.g. halogens, in both types of material.

Examples 1 and 13 contain little or no methyl groups. These spectra show the presence only of methylene ($CH_2$) groups and probably methine (CH). This material then appears to be based on C=O (ketone), $CH_2$ and CH. A minor amount of C≡N is present, but there is no way of distinguishing whether this is an additional functional group related to the structure of the compound, or whether it indicates an impurity in the sample derived from the catalyst. Again, there may be a minor amount of OH associated with the compound, but this cannot be resolved because of the presence of free water in the pellet.

Example 6 shows the presence of methyl $CH_3$ and $CH_2$, with CH not defined. A minor amount of C≡N is present, but again cannot be specified as a part of the molecule or as an evidence of impurity. There is no OH in this material. However, the peak at about 6.40 may indicate some minor amount of an organic acid salt.

The infra red spectra of the ethylene-carbon monoxide copolymers in the remaining examples have the same type of spectra shown in FIGS. 1 and 2.

I claim:

1. The method of forming a copolymer of a $C_2$–$C_8$ alpha-olefin and carbon monoxide by reacting the alpha-olefin and carbon monoxide in the presence of a minor amount of palladous cyanide in an inert reaction medium at a temperature from about 50° C. to 205° C. and at a pressure between 300 p.s.i. and 3000 p.s.i. the mole ratio of the alpha olefin to carbon monoxide being between 1:5 and 5:1.

2. The method of claim 3 in which the ratio of ethylene to carbon monoxide is about 3:7 to 4:1.

3. The method of claim 1 in which said olefin is ethylene.

4. The method of claim 1 in which the reaction is conducted in a solution selected from the class consisting of: tetrahydrofuran, chloroform, toluene, acetonitrile, heptane, ethylene glycol and water.

References Cited

UNITED STATES PATENTS

| | | | |
|---|---|---|---|
| 2,495,286 | 1/1950 | Brubaker | 260—94.9 |
| 3,194,800 | 7/1965 | Blackham | 260—94.9 |

FOREIGN PATENTS 583,172   12/1946   Great Britain.

OTHER REFERENCES

Chatani, Crystal Structure of Polyketone, J. of Poly. Sci., 55, 811–819 (1961).

Brubaker et al., Synthesis and Characterization of Ethylene/Carbon Monoxide Copolymers, J. Amer. Chem. Soc., 74, 1509–15 (1952).

JOSEPH L. SCHOFER, Primary Examiner

E. J. SMITH, Assistant Examiner

U.S. Cl. X.R.

260—63, 88.2, 93.7, 597